US010920356B2

(12) United States Patent
Hatfield et al.

(10) Patent No.: US 10,920,356 B2
(45) Date of Patent: Feb. 16, 2021

(54) OPTIMIZING PROCESSING METHODS OF MULTIPLE BATCHED ARTICLES HAVING DIFFERENT CHARACTERISTICS

(71) Applicant: INTERNATIONAL BUSINESS MACHINES CORPORATION, Armonk, NY (US)

(72) Inventors: Jennifer M. Hatfield, New York, NY (US); Michael Bender, Rye Brook, NY (US); Jill Dhillon, Austin, TX (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 65 days.

(21) Appl. No.: 16/437,475

(22) Filed: Jun. 11, 2019

(65) Prior Publication Data

US 2020/0392661 A1    Dec. 17, 2020

(51) Int. Cl.
*D06F 34/18*        (2020.01)
*G05B 19/04*        (2006.01)
*G05B 19/042*       (2006.01)

(52) U.S. Cl.
CPC ........... *D06F 34/18* (2020.02); *G05B 19/042* (2013.01); *G05B 2219/2633* (2013.01)

(58) Field of Classification Search
CPC .................. D06F 34/18; G05B 19/042; G05B 2219/2633
See application file for complete search history.

(56) References Cited

U.S. PATENT DOCUMENTS

| 9,494,993 | B2 | 11/2016 | Ahn et al. | |
|---|---|---|---|---|
| 2002/0032875 | A1* | 3/2002 | Kashani | G06F 1/1632 713/300 |
| 2002/0046157 | A1* | 4/2002 | Solomon | G06Q 30/0601 705/37 |
| 2002/0055903 | A1* | 5/2002 | Solomon | G06Q 99/00 705/37 |
| 2002/0069134 | A1* | 6/2002 | Solomon | G06Q 50/188 705/80 |
| 2002/0135611 | A1* | 9/2002 | Deosaran | G06F 11/3495 715/738 |

(Continued)

FOREIGN PATENT DOCUMENTS

| CN | 106032614 A | 10/2016 |
|---|---|---|
| WO | 2014198608 A1 | 12/2014 |
| WO | 2018219627 A1 | 12/2018 |

*Primary Examiner* — Mohammad Ali
*Assistant Examiner* — Kelvin Booker
(74) *Attorney, Agent, or Firm* — Tutunjian & Bitetto, P.C.; Michael A. Petrocelli

(57) ABSTRACT

A method of batch processing that includes registering item types to be processed by a batch management system including care instructions for the item types; recording batch items being added to a batch processing machine; and determining compatibility of at least one of each of said batch items being added to the batch processing machine to a total batch with an item to be processed to registered item match generator of said batch management system. Determining compatibility includes matching at least one of each item being added to the batch processing machine to the care instructions of the registered item types. The method may further include reporting compatibility of at least one of each item being added to the batch processing machine.

20 Claims, 7 Drawing Sheets

(56) References Cited

U.S. PATENT DOCUMENTS

| | | | |
|---|---|---|---|
| 2003/0074301 A1* | 4/2003 | Solomon | G06Q 30/08 705/37 |
| 2003/0233305 A1* | 12/2003 | Solomon | G06Q 30/08 705/37 |
| 2018/0127910 A1 | 5/2018 | Xu et al. | |
| 2018/0188704 A1* | 7/2018 | Cella | H04L 67/125 |
| 2018/0284735 A1* | 10/2018 | Cella | H04L 1/0002 |
| 2019/0121350 A1* | 4/2019 | Cella | H04L 67/12 |

\* cited by examiner

OPTIMIZING PROCESSING METHODS OF MULTIPLE BATCHED ARTICLES HAVING DIFFERENT CHARACTERISTICS

BACKGROUND

The present invention generally relates to processing methods, and more particularly to employing devices that are connected to the internet to manage the requirements of individual items being processed in a same batch.

Multiple people practicing methods to batch process objects may have difficulty when the objects being batched may have different processing requirements. For example, in some households there can be multiple people that use a laundry facility. They may not be well versed on the specific care for effective clothing care and optimum washer/dryer conditions; and even when well versed, they may not be aware of the recommendation process for every article going through the process.

SUMMARY

In accordance with an embodiment of the present disclosure, a method is disclosed to optimize processing methods of multiple batched articles having different characteristics.

In some embodiments, the methods and systems described herein can make recommendations and/or make automatic adjustments to batch processing devices based on cognitive analysis of items and end to end cycle of the batch process, e.g., a laundry cycle, which may include a clothes washer machine and/or a clothes drying machine. The methods and the batch management system can also recognize the types of items being processed and provide process cycles having the settings and/or characteristics suitable for the types of items that are being batch processed. The batch management system can provide automatic updates to the user and/or the batch processing devices, e.g., clothes washers and/or settings, and can provide for adjustments to the input (items in the batch). e.g., clothing items in the load to be washed. The methods for batch processing, and the batch management systems can also provide notifications to users of feedback and recommended adjustments.

In one embodiment, the computer enabled method of processing multiple batched articles having different characteristics may include receiving, at a computer system, a request for assistance regarding a specified task, initiated by a user; evaluating required items, and instructions, including accessing a data store of items in a residence, registered by the user, to determine available items to achieve the task; determining the user's preferences from a historical database and machine learning of preferences of the user determining an appropriate combination of items, ingredients, resources, and instructions to achieve the task in task instructions for communication to the user, and communicating the task instructions to the user using a device via audio and/or text.

In another embodiment, the computer enabled method for optimizing a batch processing task include registering a user to a batch management system that collects data from the user, wherein the user can revoke permission to the batch management system at any time; and registering item types to be processed by the batch management system including care instructions for the item types. The method may further include recording each batch item being added to a batch processing machine. The method may further include determining compatibility the batch items being added to the batch processing machine to a total batch with an item to be processed to registered item match generator of the batch management system. In some embodiments, determining compatibility comprises matching at least one of the batch items being added to the batch processing machine to the care instructions of the registered item types. The computer enabled method may further include reporting compatibility of at least one of the batch items being added to the batch processing machine.

In another aspect, a batch management system is provided for optimizing a batch processing task. The batch management system may include an item registry for registering item types to be processed by the batch management system including care instructions for the item types. The system can further include an article identity interface for recording batch items being added to a batch processing machine; and an item to be processed to registered item match generator for determining compatibility of at least one of the batch items being added to the batch processing machine to a total batch. Determining compatibility may include matching at least one of each item being added to the batch processing machine to the care instructions of registered item types. In some embodiments, the batch management system further includes an item compatibility message transmitter for reporting compatibility of at least one the batch items added to the batch processing machine.

In another aspect, the present disclosure provides a computer program product comprising a computer readable storage medium having computer readable program code embodied therein for optimizing a batch processing task. In one embodiment, the computer readable storage medium is non-transitory. The computer readable program code can provide the steps of registering a user to a batch management system that collects data from the user, wherein the user can revoke permission to the batch management system at any time; registering item types to be processed by the batch management system including care instructions for the item types; and recording batch items being added to a batch processing machine. The method may further include determining compatibility of the batch items being added to the batch processing machine to a total batch with an item to be processed to registered item match generator of the batch management system. In some embodiments, determining compatibility comprises matching at least one of each item being added to the batch processing machine to the care instructions of the registered item types. The computer enabled method may further include reporting compatibility of at least one of the batch items being added to the batch processing machine.

These and other features and advantages will become apparent from the following detailed description of illustrative embodiments thereof, which is to be read in connection with the accompanying drawings.

BRIEF DESCRIPTION OF THE DRAWINGS

The following description will provide details of preferred embodiments with reference to the following figures wherein.

DETAILED DESCRIPTION

Reference in the specification to "one embodiment" or "an embodiment" of the present invention, as well as other variations thereof, means that a particular feature, structure, characteristic, and so forth described in connection with the embodiment is included in at least one embodiment of the present invention. Thus, the appearances of the phrase "in one embodiment" or "in an embodiment", as well any other variations, appearing in various places throughout the specification are not necessarily all referring to the same embodiment.

In some embodiments, the disclosure provides methods, systems and computer program products that provide a method and system for optimizing care for batched processes. For example, the methods, systems and computer program products that are described herein provide for optimizing processing methods of multiple batched articles having different characteristics. For example, the methods, systems and computer program products that are described herein may be applicable to laundry services, such as clothes washers and/or dryers.

In one embodiment, a method is provided of cognitive analysis for the inputs of the self-laundering experience. The methods, systems and computer program products can provide an end to end experience to a user operating a laundry device, such as a clothes washer and/or dryer, that includes identifying the care need for items requiring special care; validating that the optimal mix of items is present; prepping the laundering system for the actual articles of clothing that will be washed; and recommending wash and dry cycles, temperature settings, and special care for specific items.

In some instances, item care is determined by the label where appropriate, while other items can be classified by just their look (e.g a white t-shirt). Items are registered with the batch management system and can be identified via image analysis as an item is going into the washer, or via internet of things (IoT) sensors in smart apparel. When the first non-compatible item to be cleaned is added to the machine, a visual display will prompt the user and show the item that was added and suggest it be removed. The person loading the machine can override the care for the item, and the batch management system will start to learn the individual preferences for a person or household.

In some embodiments, the appliances being used, e.g., clothes washer and/or dryer, may be smart devices that provide the interface to the user. While this can be valuable in the smart washer embodiment, an independent camera and display, which can be integrated into a digital personal assistant, can provide the interface between the batch management system and the user without the additional costs of integrating this capability into a device. The methods, systems and computer program products are described in further detail with reference to FIGS. 1-7.

Figure 1:
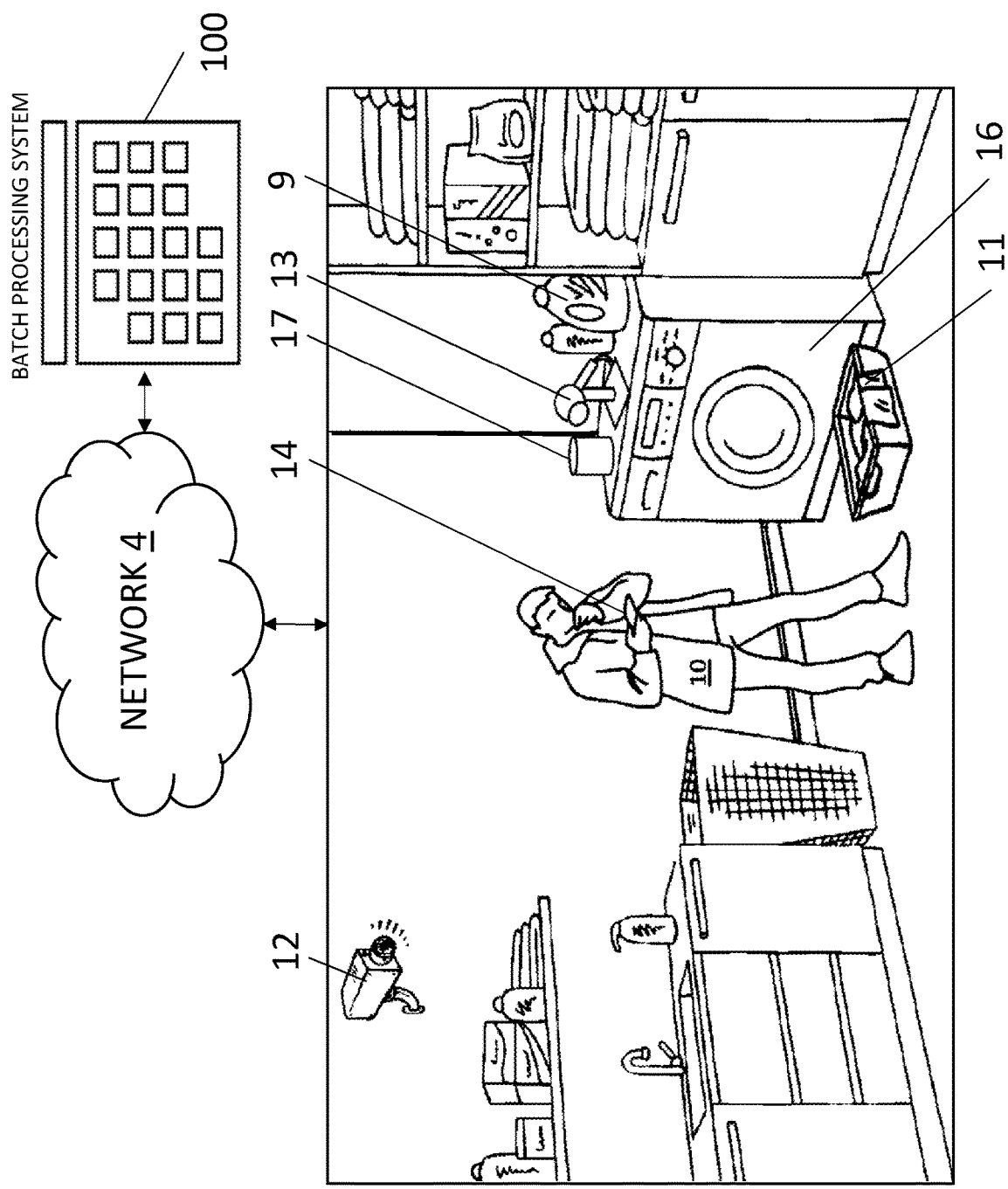
FIG. 1 is a diagram illustrating an example environment for a method and system for optimizing processing methods of multiple batched articles having different characteristics, in accordance with one embodiment of the present disclosure.
Figure 2:
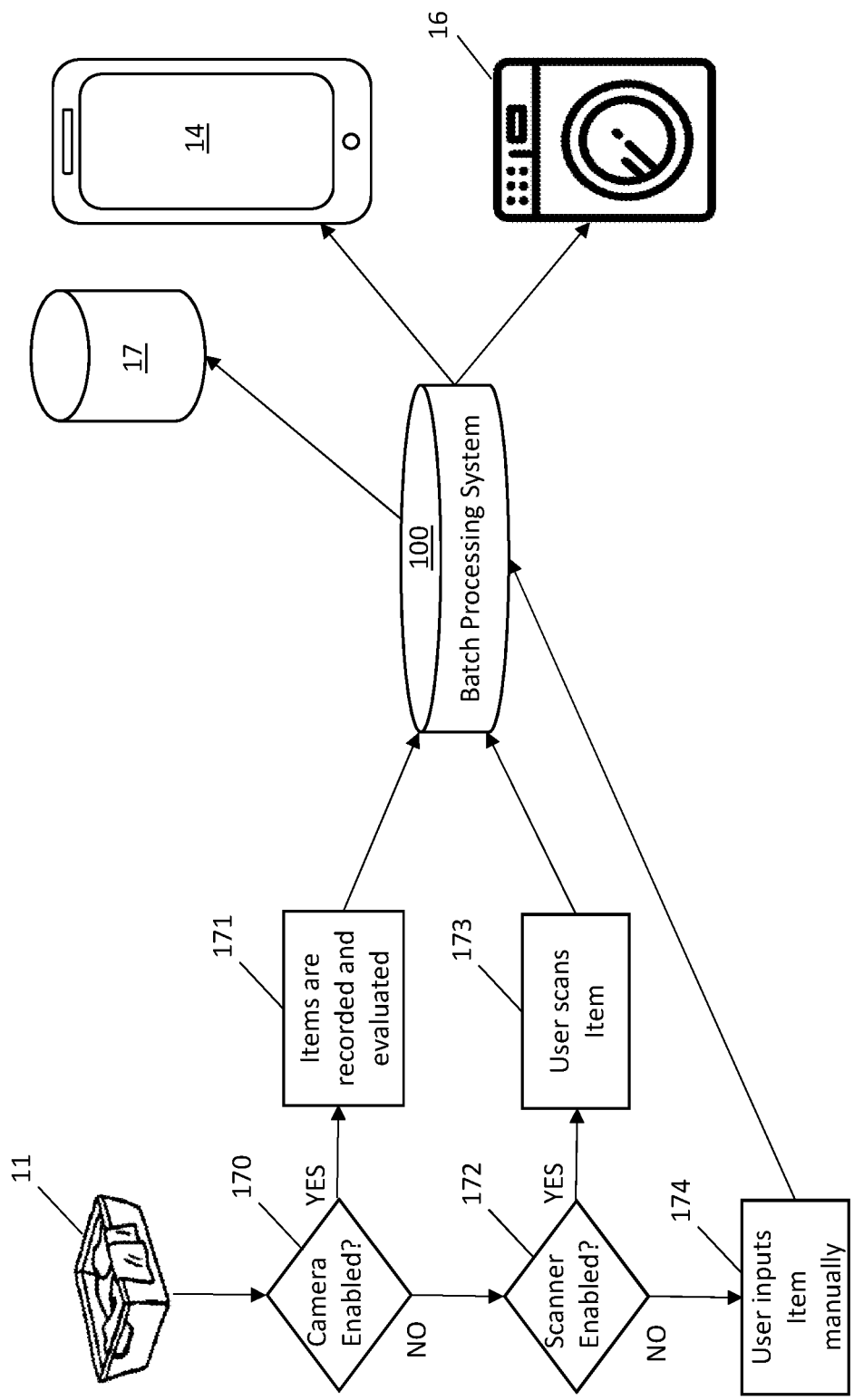
FIG. 2 is a block/flow diagram showing one embodiment of the steps of recording data on the items being processed by the system for optimizing processing methods of multiple batched articles having different characteristics.
Figure 4:
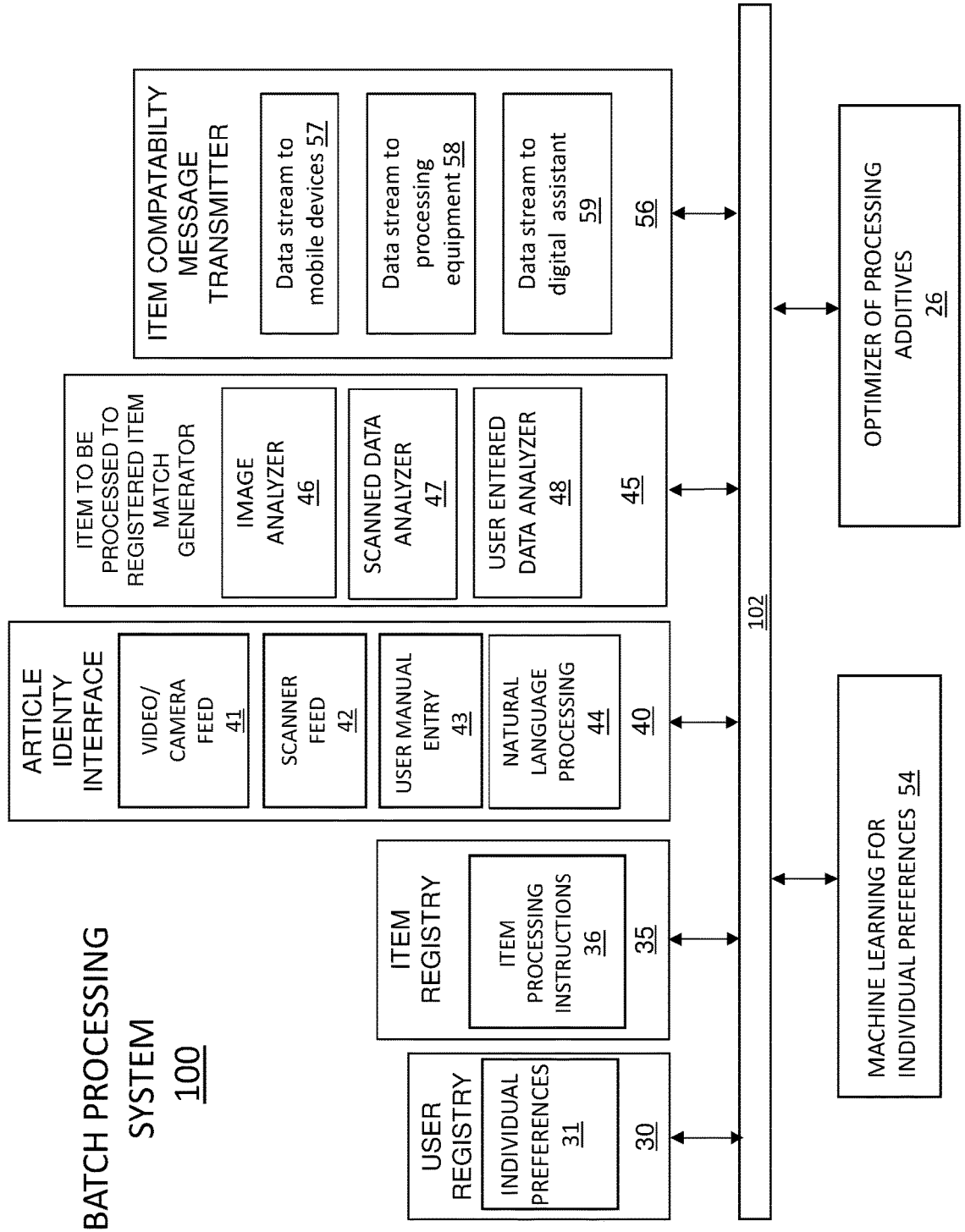
FIG. 4 is a block diagram illustrating a system for optimizing processing methods of multiple batched articles having different characteristics, in accordance with one embodiment of the present disclosure.

FIG. 1 is a diagram illustrating an example environment for a method and system for optimizing processing methods of multiple batched articles having different characteristics. FIG. 2 is a block/flow diagram showing an embodiment of a method for optimizing processing methods of multiple batched articles having different characteristics. FIG. 4 is a block diagram illustrating a system for optimizing processing methods of multiple batched articles having different characteristics.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

In some embodiments, the method may begin at block 1, which can include registering users 10 with the system for managing batch processing 100. The method may begin with in response to receiving permission from a user 10 for data collection, and registering users 10 with the system for managing batch processing 100. To the extent implementations of the invention collect, store, or employ personal information provided by, or obtained from, individuals (for example, current locations of drivers, historical records of drivers, etc.), such information shall be used in accordance with all applicable laws concerning protection of personal information. Additionally, the collection, storage, and use of such information may be subject to consent of the individual to such activity, for example, through "opt-in" or "opt-out" processes as may be appropriate for the situation and type of information. Storage and use of personal information may be in an appropriately secure manner reflective of the type of information, for example, through various encryption and anonymization techniques for particularly sensitive information.

Referring to FIG. 4, the users 10 being registered may be recorded and stored in user registry 30 on the batch management system 100. The user registry 30 may include at least one form of memory, such as hardware memory, for storing user information.

The registration of the users 10 can also include the registry of devices for tracking items during the methods for optimizing processing of multiple batched articles having different characteristics. For example, referring to FIG. 1 illustrating the optimization of a laundry process, the registration may also include registration of cameras 12, scanners 13, mobile devices 14, processing devices (e.g., laundry equipment 16), digital assistants 17, and all other devices, objects and items that are the source of data and/or are the subject of process adjustments through the batch management system 100. The batch management system 100 and the cameras 12, scanners 13, mobile devices 14, processing devices (e.g., laundry equipment 16), digital assistants 17, and all other devices that are communicating with the batch management system 100 can be interconnected over a network 4 including the internet.

For example, the devices, e.g., cameras 12, scanners 13, mobile devices 14, processing devices (e.g., laundry equipment 16), digital assistants 17 and combinations thereof, that the batch management system 100 can be in communication with can include a WiFi radio to establish a WiFi connection through a WiFi access point or router which couples the devices hub to the Internet (e.g., via an Internet Service Provider providing Internet service to the end user), which in turn connect to the batch management system 100/network 44. In another example, the devices, e.g., cameras 12, scanners 13, mobile devices 14, processing devices (e.g., laundry equipment 16), digital assistants 17 and combinations thereof, that the batch management system 100 can be in communication with can include a cellular radio to establish a connection to the Internet via a cellular service such as a 4G (e.g., Mobile WiMAX, LTE) or 5G cellular data service. Of course, it should be noted that the underlying principles of the invention are not limited to any particular type of communication channel or protocol, but is suitable for use with any transmission medium. As used herein, "transmission medium" refers to any intangible (e.g., transitory) medium that is capable of communicating (e.g., transmitting) instructions for execution by a machine (e.g., by one or more processors of such a machine), and includes digital or analog communication signals or other intangible media to facilitate communication of such software.

Referring to FIGS. 1-4, the method may progress to block 2, which can include registering item types to be processed by the batch management system 100. The registration of the item types to be processed may include recording with the batch management system care instructions, which may also be referred to as processing instructions, for the item types being registered. The item types being registered may be recorded and stored in item registry 35 on the batch management system 100. The care instructions 36 may be stored in a module, e.g., module of hardware memory, in the item registry 35. In some embodiments, in which the batch optimization process is applied to laundering clothes as depicted in FIG. 1, the method provides a way of registering clothing 11 with the batch management system 100 so that it can be identified when being washed/dried, and the clothing 11 can be properly processed, e.g., cleaned and/or dried. In one example, for each article of clothing 11, the batch management system 100 can take an image of the item, can get the identity of the item by the user scanning the item and/or the batch management system 100 can capture a unique identifier for the item, e.g., an item of clothing including an internet of things (IOT) device can include an identifier that can be read by the batch management system 100.

Figure 5:
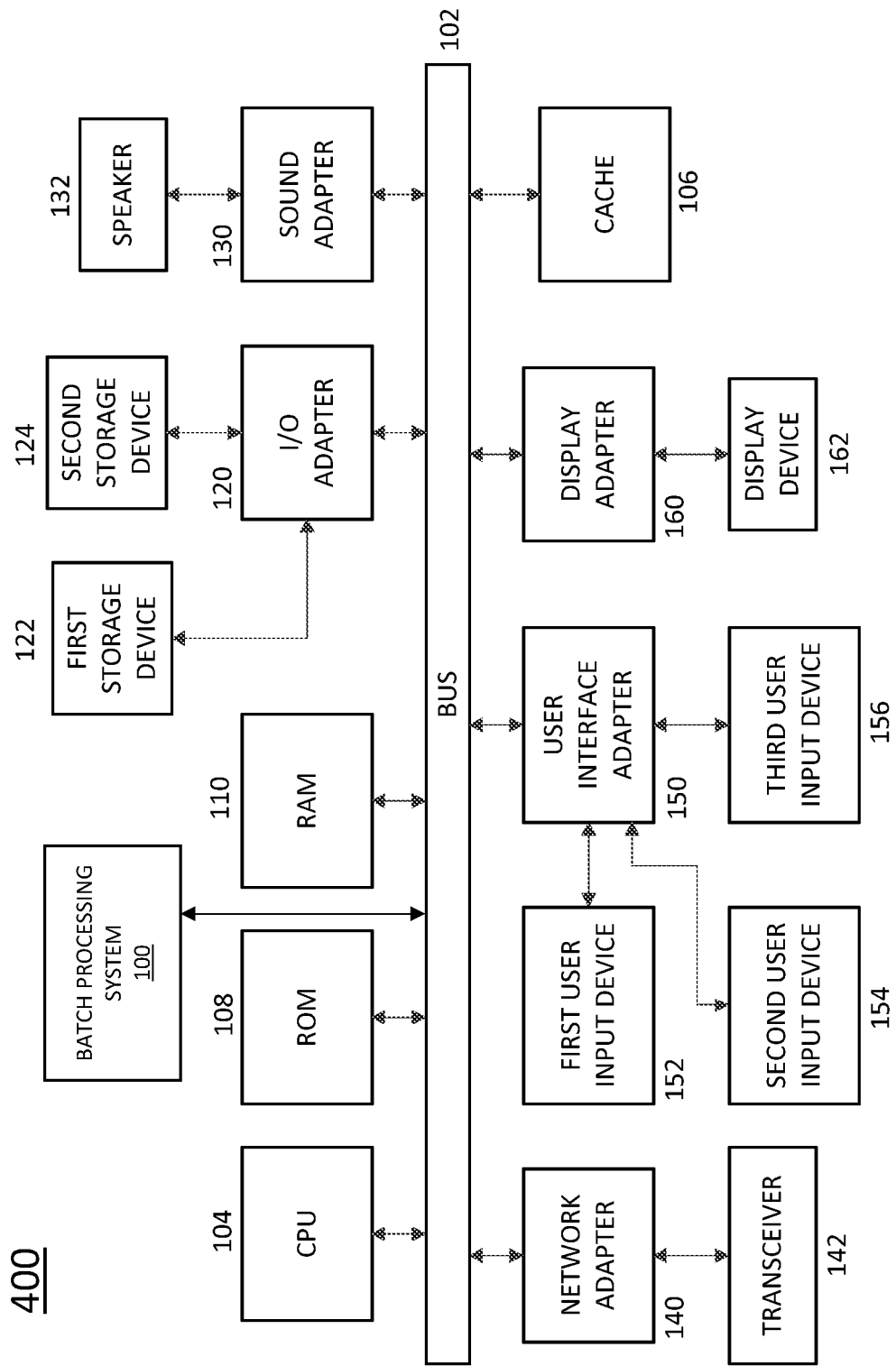
FIG. 5 is a block diagram illustrating a system that can incorporate the system depicted in FIG. 4 for performing a method for optimizing processing methods of multiple batched articles having different characteristics, in accordance with one embodiment of the present disclosure.

Referring to FIG. 1, the batch management system 100 may be integrated with cameras 12, such as video cameras, e.g., security cameras, and scanners 13, e.g., a radio frequency identification reader (RFID) scanner, to identify the items, e.g., articles of clothing 11. The term "scanner" denotes a device including a light source, a lens and a photo conductor translating optical impulses into electrical ones. Referring to FIG. 5, the batch management system 100 may include an article identification interface 40 for reading the articles, which can be employed during the registration process. For example, the article identification interface 40 may include each of a video/camera feed 41, a scanner feed 42, and a user manual entry feed 43. The video/camera feed 41 can include a receiver for receiving images from the cameras 12; the scanner feed 42 and include a receiver for receiving data signal from the scanner 13, and the user manual entry feed 43 can receive data signals from a device having an interface with the user 10, e.g., a mobile device 14 suitable for receiving commands. For example, the mobile device 14 used by the user 10 to enter item registry information may be one of wearable devices, such as smart watches, smart phones, tablet computers, laptop computers and combinations thereof.

Figure 3:
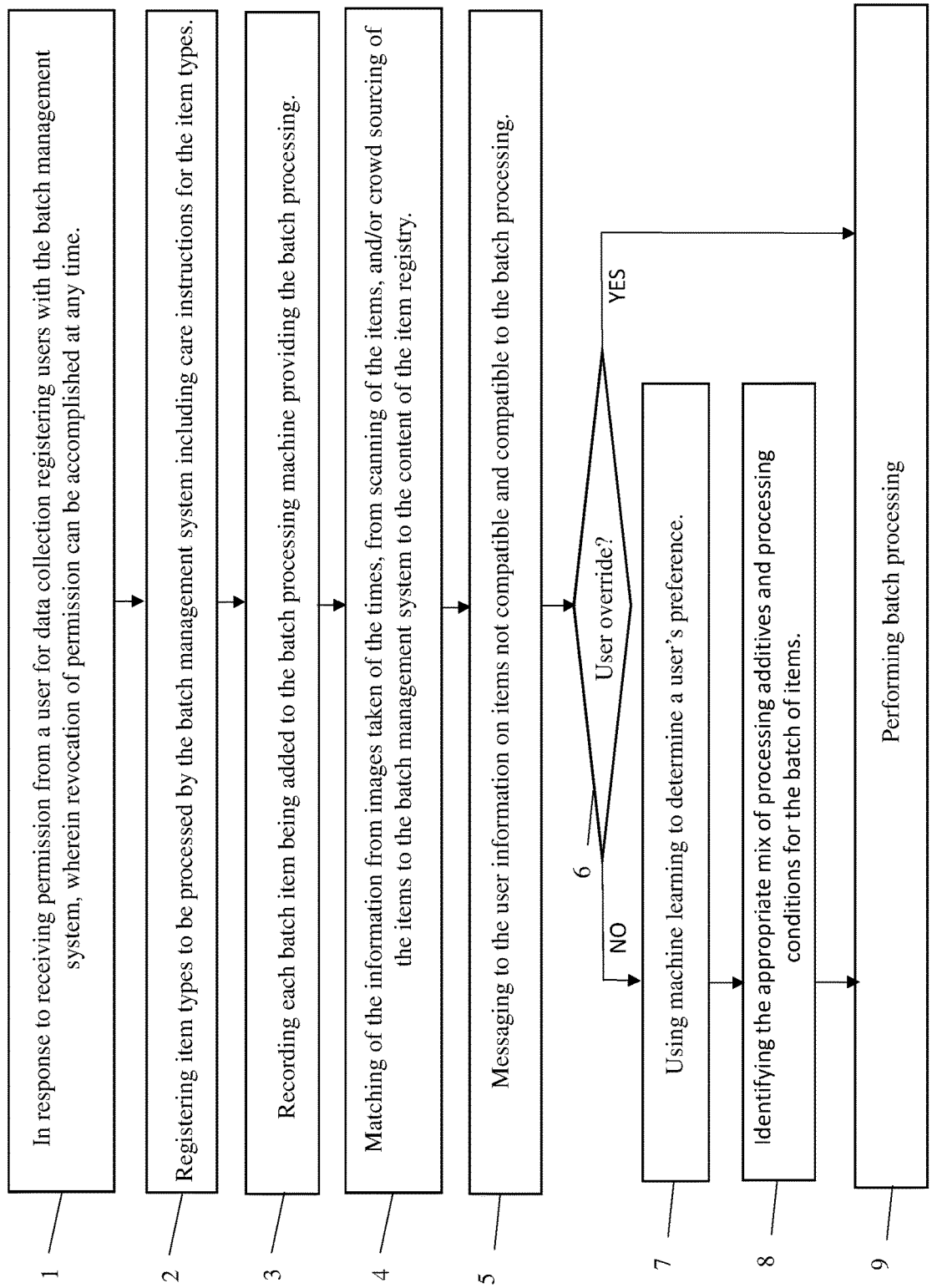
FIG. 3 is a method for optimizing processing methods of multiple batched articles having different characteristics, in accordance with an embodiment of the present disclosure.

In some embodiments, in which the item types being processed are clothing items 11, the step of registering items to be processed by the batch management system 100 at block 2 of the method depicted in FIG. 3 may include capturing an image with the batch management system 100 of a document including care/processing instructions for the item to be processed. For example, when the item being processed is an item of clothing 11, the instructions being captured can be read from a clothing tag, which includes care instructions for the item of clothing 11 that the tag is affixed to. The batch management system 100 may include a natural language processing translator 44, which can convert the image of the care/processing instructions into data that can be stored in the item processing instructions 36 of the item registry 35. Natural language processing (NLP) is a subfield of computer science, information engineering, and artificial intelligence concerned with the interactions between computers and human (natural) languages, in particular how to program computers to process and analyze large amounts of natural language data. Natural language processing frequently involve speech recognition, natural language understanding, and natural language generation. The natural language processing translator 44 may include at least one processor, e.g., hardware processor, for executing a set of instructions stored in memory, e.g., hardware memory for proving the function of language processing of instructions taken from an image correlated to an item of clothing 11.

Block 2 of the method can provide a database of item types, e.g., clothes items 11, and the associated care that those items can require. e.g., laundering instructions for the clothes items 11.

Referring to FIG. 3, the method may continue at block 3 by determining each batch item that is being added to the batch processing machine, e.g., laundry equipment 16. Referring to FIG. 1, in some embodiments, in which the batch items being processed are clothing items 11, the processing machine may be a piece of laundry equipment 16, such as a clothes washer, a clothes dryer, a washer extractor, a continuous batch washer, a clothing press, a clothing iron and combinations thereof. It is noted that the above examples are provided for illustrative purposes only and are not intended to be limiting.

In some embodiment, the method to identify the items being put in the machine at block 3 not only identifies what item, e.g., clothes item 11, is being put in the machine, e.g., laundry equipment 16, but begins the process of determining the care that is needed for the item being processed, e.g., the laundry care for the clothes item 11, based on what was registered at block 2.

The batch management system 100 may include a batch item to registered item match generator 45. The batch item to registered item generator 45 may employ image analysis provided by an image analyzer 46 of images taken of the batch item, e.g., clothing item 11, being placed in the laundry equipment 16 to compare with the saved data. e.g., data saved in the item registry 35, which may include previously recorded images of clothing items 11.

When a match is determined between the image taken of the batch item, e.g., clothing item 11 being added to the processing machines, e.g., laundry equipment 16, the batch item to registered item match generator 45 can signal the item processing instructions 36 of the matched item to provide the care for the measured item.

The image analyzer 46 may employ artificial intelligence utilizing computer software programs that analyze the images from the cameras 12 in order to recognize items, e.g., clothing items 11. The A.I. program functions by using machine vision. Machine vision is a series of algorithms, or mathematical procedures, which work like a flow-chart or series of questions to compare the object seen, which may be the item. e.g., clothing items 11, with stored reference images of items in different angles, positions and movements. Many other questions are possible, such as the degree to which the object is reflective, the degree to which it is steady or vibrating, and the smoothness with which it moves. Combining all of the values from the various questions, an overall ranking is derived which gives the A.I. the probability that an item, such as clothes item 11, being placed in the processing equipment. e.g., laundry equipment 16, matches an item stored in the storage registry. This type of A.I. is known as "rule-based".

In some embodiments, the image analyzer 46 includes at least one hardware processor for executing a series of instructions for analyzing the images taken by the camera 12, comparing the images correlated to comparison objects from the data saved in the item registry 35, and identifying the when the user 10 is incorrectly including an item in batch processing with other items.

The use of cameras 12 to identify items, e.g., clothing items 11, being introduced to a processing machine, e.g., piece of laundry equipment 16, is only one means that the methods described herein can determine that an item is being added to a machine at block 3. In some other embodiments, internet of things (IOT) sensors, which can be integrated into the processing machine, e.g., a digital assistant 17, can identify items based on registered items. The Internet of things (IoT) is the network of physical devices, vehicles, home appliances, and other items embedded with electronics, software, sensors, actuators, and connectivity which enables these things to connect, collect and exchange data. The IoT devices can be equipped with various types of sensors to collect information about themselves and their surroundings and provide the collected information to the misplaced object locating system over a network, such as an internet connected network.

Examples of internet of things (IOT) devices that have image taking abilities, e.g., video and/or camera picture taking, can include security cameras; baby monitors; computers with web cams; televisions with web cams, front and/or back facing cameras of mobile devices, such as smart phones and/or tablet computers; and combinations thereof. Other examples of internet of things (IOT) that can include a video camera for include a lightbulb, a luminaire, a lighting system, a door lock, a water heater, a sprinkler system, an air-conditioner, a thermostat, an alarm clock, a window shade, a switch, a smoke alarm, an electrical outlet, an alarm, a personal proximity sensor, a door sensor, a biometric sensor, an automotive sensor, a cooking device, an electrical breaker, a personal alert sensor, a motion sensor, a calendar, a radio, a radio frequency identification (RFID) tag/RFID detector, a vehicle, an electric vehicle charger, a distributed generator (e.g. solar panel), a distributed energy storage (e.g. battery), a thermometer, and combinations thereof. Each of these examples, which can include a camera, can take images of the batch item.

Unregistered items "recommended care" can be scanned if the batch management system 100 determines that it has not been registered, i.e., an item, such as a clothes item 11, is not present in the item registry 35. In some embodiments, the clothing tag of the clothes item 11 can be scanned using a scanner 13 operated by the user 10, in which the care instructions from the tag is saved in the item registry 35 by the batch management system 100. This can provide one example of a learning step for the batch management system 100. In some other embodiments, the batch management system 100 can use crowd sourcing to find the best match for the item. e.g., clothes item 11, based on the look, e.g., shape, size, color or combination thereof, of the item.

In some embodiments, the method may continue by determining whether any of the singular items is incompatible with the batch of items being processed at block 4 of FIG. 3. In some embodiments, the method provided herein teaches how to identify if incompatible items have been entered, and how to respond to the batch based on user behavior and individual preferences. In some embodiments, the method of determining whether any of the singular items is incompatible with the batch of items being processed includes matching of the information images taken of the items, from scanning of the items, and/or crowd sourcing of the items to the batch management system 100 to the content of the item registry can provide for a matched item having care instructions that is saved in the item processing instructions 36. In some embodiments, the system identifies items that require different care or treatment.

As described above, the batch item to registered item match generator 45 includes an image analyzer 46 for comparing images to the item registry 35. The image item generator 45 may also include a scanned data analyzer 47 and/or a user entered data analyzer 48. Each of the scanned data analyzer 47 and/or a user entered data analyzer 48 may employ artificial intelligence utilizing computer software programs that analyze the data from the scanned data analyzer 47 and/or a user entered data analyzer 48 in order to recognize batch items. e.g., clothing items 11. Artificial intelligence (AI) is the simulation of human intelligence processes by machines, especially computer systems. These processes include learning (the acquisition of information and rules for using the information), reasoning (using rules to reach approximate or definite conclusions) and self-correction. The functions of the scanned data analyzer 47 and/or a user entered data analyzer 48 may be provided by some form or artificial intelligence providing device, such as an artificial neural network providing device. An artificial neural network (ANN) is an information processing system that is inspired by biological nervous systems, such as the brain. The key element of ANNs is the structure of the information processing system, which includes a large number of highly interconnected processing elements (called "neurons") working in parallel to solve specific problems. ANNs are furthermore trained in-use, with learning that involves adjustments to weights that exist between the neurons. An ANN is configured for a specific application, such as pattern recognition or data classification, through such a learning process.

In some embodiments, each of the scanned data analyzer 47 and the user entered data analyzer 48 includes at least one hardware processor for executing a series of instructions for analyzing the data taken from the scanner 13 and/or the data manually entered by the user, comparing the data to comparison objects from the data saved in the item registry 35, and identifying the when the user 10 is incorrectly including an item in batch processing with other items.

Referring to FIG. 3, the method may continue to block 5, which includes messaging to the user information on items that are not compatible, and information on items that are compatible to the batch processing. In some embodiments, the system prompts the user to remove an item from the batch. For example, the batch management system 100 can display a warning and an image of the item that should be removed. For example, the batch management system 100 may include an item compatibility message transmitter 56 that can send a warning regarding incompatibility to either a mobile device 17 providing interface to the user 10. This can include a data stream to mobile devices 57. In other embodiments, the item compatibility message transmitter 56 includes a data stream to an interface of the processing equipment 58, e.g., laundry equipment 16. In yet another embodiment, the item compatibility message transmitter 56 includes a data stream to an internet of things device, e.g., digital assistant 17. Each of these data streams to potential interfaces with the user 10 can provide messages to the user 10 regarding optimized batch processing.

For example, the batch management system 100 provides a message to the user using at least one of the aforementioned data streams of the item compatibility message transmitter 56 to remove an item, e.g., clothing item 11, from the processing device, e.g., laundry equipment 16, that is not compatible for batch processing. This can be via text on the screen of a mobile device 14 or screen on the processing device, e.g., laundry equipment 16. In another example, the message to the user 10 may be an auditory message delivered to the user 10 from the digital assistant 17 and/or the processing device, e.g., laundry equipment 16.

It is noted that the message to the user 10 is not limited to only directions to remove an item from the batch. For example, the batch management system 100 can identify specific items. e.g., items of clothing 11, that may need different care and/or treatment than the settings for the processing device, e.g., laundry equipment 16, are set at for the current batch. The batch management system 100 can identify the settings that need to be set on the processing device, e.g., laundry equipment 16, which should be set to adequately process the item, e.g., clothing item, being added, as well as the entire batch of items.

In some embodiments, the batch management system 100 compares incompatible items to historical treatment plans. If a learned response exists, the batch management system 100 identifies the usual treatment. If non-compatible items exist, the batch management system 100 prompts user 10 for treatment. If no reference for treatment and no response has been saved by the batch management system 100, the batch management system 100 identifies the lowest common treatment.

FIG. 2 is a flow chart of actions during the blocks 3, 4 and 5 of the method described with reference to FIG. 3, in which blocks 3 and 4 include determining each item being added to the machine providing the batch processing, and messaging to the user information on items not compatible and compatible to the batch processing.

In some embodiments, the process flow begins with the batch management system 100 determining when an item, e.g., clothes item 11, is being inserted into a processing device, e.g., laundry equipment 16, whether the item can be recorded for taking an image by the camera 12 at block 170 of FIG. 2. If the system is camera enabled at block 170, the method may continue to the items for batch processing being recorded and evaluated at block 171, as described above with reference to block 3 of FIG. 3. Referring to FIG. 2, the items for batch processing recorded by the camera 12 are sent to the batch management system 100 for determining if the information from the images taken of the items matches content in the item registry, as described above in block 4 of FIG. 3. The items for batch processing recorded by the camera 12 are transmitted across the network 4 to the batch management system 100. Following processing of the data in the batch management system 100 (e.g., processing of the data taken from the camera by the item to be processed to registered item match generator 45) to provide matches between the images taken by the camera 12 and the items stored in the item registry 35, the batch management system 100 may then message to the user 10 information on which items, e.g., clothing items 11, are compatible with the settings for the batch processing equipment, e.g., laundry equipment 16. The batch management system 100 may also send messages to the user 10 with information on which items, e.g., clothing items 11, are not compatible with the settings for the batch processing equipment, e.g., laundry equipment 16. The batch management system 100 can also send messages to the user 10 with information on which items, e.g., clothing items 11, are not compatible with the settings for the batch processing equipment. e.g., laundry equipment 16. The batch management system 100 can also provide to the user 10 adjusted settings for the batch processing equipment, e.g., laundry equipment 16, to adjust the batch processing equipment to the revised batch being processed including the newly added items, e.g., newly added clothing items 11. Each of these types of messages can be received at a mobile device 14, processing equipment (e.g., laundry equipment 16), and/or digital assistance 16, which may relay the message to the user 10 by text and/or auditory signal (e.g., voice messages). The mobile device 14, the processing equipment (e.g., laundry equipment 16) and the digital assistant 17 may each be connected to the batch management system 11 over the network 4.

Referring back to block 170, when the batch management system 100 is not camera enabled, the item identity may be determined by the user 10 scanning the item, e.g., clothing item 11, using a scanner 13 at blocks 172 and 173. The information read from the item by the scanner 13 is transmitted to the batch management system 100 over the network 4. The scanned information is then processed by the batch management system 100 to determine if the batch processing is optimized. For example, the batch management system 100 comparing the scanned data to the data in the item registry 35 of the batch management system 100 determines compatibility of the items to the settings of the processing equipment and/or determines the settings of the processing equipment that can provide adequate processing of the batch including the newly added items. This information is forwarded as a message to the user across an interface that include a mobile device 14, digital assistant 17 and/or the processing equipment, e.g., laundry equipment 16.

Referring back to block 172 of FIG. 2, in some examples, the batch management system 100 may not be scanner enabled. In this instance, in which the batch management system 100 is not employing a scanner 13, the user may manually enter information for items. e.g., clothing items 11, being added to the processing equipment, e.g., laundry equipment 16, at block 174. For example, when the interface between the user 10 and the batch processing equipment 100 is a mobile device 14, e.g., smart phone, tablet, laptop, etc., the user may enter the identity and/or care information for the item. e.g., clothing item 11, into batch processing equipment, e.g., laundry equipment 16, on their mobile device 14 by entering data via text through an application being run on the mobile device 14.

In another example, when the interface between the user 10 and the batch processing equipment 100 is a mobile device 14. e.g., smart phone, tablet, laptop, etc., the user may enter the identity and/or care information for the item. e.g., clothing item 11, into batch processing equipment, e.g., laundry equipment 16, on their mobile device 14 by entering data via text through an application being run on the mobile device 14. In other examples, the user interface for manually entering item identity, as well as item processing instructions, may be present in the batch processing equipment, e.g., laundry equipment 16. In yet other examples, the user 10 may enter item information by voice command to an internet of things (IoT) device, such as a digital assistant. Digital assistants offer connectivity and control of internet of thing (IoT) devices. The term "digital assistant" denotes a software agent that can perform tasks or services for an individual based on verbal commands. Some virtual assistants are able to interpret human speech and respond via synthesized voices. Users can ask their assistants questions, control home automation devices and media playback via voice, and manage other basic tasks such as email, to-do lists, and calendars with verbal commands. In some embodiments, the digital assistant may employ a voice response system. As will be described herein, the system that the person is interacting with is a "voice response system". As used herein, a "voice response system (VRS)" is a computer interface which responds to voice commands, instead of responding to inputs from a mouse or a keystroke. In some examples, the voice response system employs a type of speech synthesis where sentences are organized by concatenating pre-recorded words saved in a database.

The information on the item manually entered by the user 10 is transmitted to the batch management system 100 over the network 4. The information is then processed by the batch management system 100 to determine if the batch processing is optimized. For example, the batch management system 100 comparing the manual entered data to the data in the item registry 35 of the batch management system 100 determines compatibility of the items to the settings of the processing equipment and/or determines the settings of the processing equipment that can provide adequate processing of the batch including the newly added items. This information is forwarded as a message to the user across an interface that include a mobile device 14, digital assistant 17 and/or the processing equipment. e.g., laundry equipment 16.

Referring to FIG. 3, the method may continue to block 6, in which the user 10 may override the suggestion by the batch management system 100 whether the item is compatible or not compatible. If the user 10 overrides the batch process system 100, the method continues to block 9, which includes performing batch processing. In some embodiments, if the user 10 overrides the batch process system 100, the system may still make recommendations regarding further processing, such as what additives would be beneficial to the items of the back during the batch processing.

Referring to FIG. 3, in other embodiments, in which the user 10 does not ignore the recommendations from the batch management system 100 regarding item compatibility, e.g., clothing item compatibility, the method may continue by using machine learning to determine a user's preference at block 7. Referring to FIG. 4, the batch management system 100 may include a machine learning analyzer for determining individual preferences 54. The machine learning analyzer may employ artificial intelligence applications.

In some embodiments, to determine a user's preference in operating a batch process, e.g., operating batch equipment, such as the laundry equipment 11, the method actuated by the batch management system 100 may include ingesting data regarding items being washed/dried; and ingests how items, e.g., clothing items 11, are treated to provide proper processing. The batch management system 100 also ingests user responses to previously recommended item settings. The batch management system 100 may also include data entry for the processing results of previous item combinations, e.g., different types of clothing, in batch processing and/or previous settings for processing devices, e.g., laundry equipment 16. In some embodiments, during this step of the method, the machine learning analyzer for determining individual preferences 54 creates a personal corpus based on historical actions. The personal corpus of historical actions that is learned by the machine learning analyzer for determining individual preferences 54 may be saved in an individual preferences 31 module of memory in the user registry 30 of the batch management system 100.

Referring to block 8 of the method depicted in FIG. 3, the batch management system 100 can identify the appropriate mix of processing additives and processing conditions for the batch of items, e.g., temperature, laundry detergent and supplements. In some embodiments, this method teaches how to recommend the optimal settings based on the identified mix of items, recommended care, personal care preferences. When enabled, the system will automatically load these items or modify the settings. In addition, special care can come from analysis of the need for an item as it is put in the machine (e.g. extra dirty, extra odorous). The batch management system 100 can scan items, e.g., clothing items 11, as they are put into the processing machine, e.g., laundry equipment 16. In some embodiments, the batch management system 100 can scan for dirt on the clothing items 11. This can be achieved by image analysis. In one example, the cameras 12 can provide the images of the dirty portions of the clothing items 11. In yet another example, the batch management system 100 may scan the items, e.g., clothing items 11, for smell. The sensor analysis for providing the smells for the clothing items 11 may include collection of the scent by electronic nose. In some embodiments, from the image analysis for identifying the presence of dirt on the clothing, and/or from the sensory analysis for identifying the presence of a smell being emitted by the clothing, the system identifies items that are outside the range of the process conditions set by the processing equipment, e.g., laundry equipment 16. In some embodiments, in view of the items, e.g., clothing items 11, being outside the range of a suitable treatment process, the batch management system 100 may recommend additional supplements for the batch process at block 8 of FIG. 3. In some embodiments, block 8 of the method depicted in FIG. 3 may include identifying the appropriate mix of processing additives and processing conditions for the batch of items. For example, when the items are clothing items 11, the additive may be laundry detergent 9. It is noted that laundry detergent 9 is not the only additive that can be considered by the batch management system 100 when applied to laundering applications. For example, clothing brighteners, bleaches, softeners and other additives may be considered as additives to be used to process the batch, as suggested by the batch management system 100.

To provide an approximate mix of processing additives and processing conditions for the batch of items, the batch management system 100 may employ an optimizer of processing additives 26. The optimizer of processing additives 26 considers the characteristics of the items in the batch, e.g., clothing items 11, the characteristics of the processing equipment, e.g., laundry equipment 16, and the historical individual preferences 31 stored in the user registry 30 in making a recommendation for the selection of processing additives, e.g., laundry detergent. In some embodiments, the batch management system 100 looks at historical settings and recommends a pre-set option from the historical settings. The optimizer of processing additives 26 may employ artificial intelligence applications.

Referring to FIG. 3, the method may continue to block 9, which includes performing batch processing. At block 9, the instructions are provided to the user 10 of the settings that the processing equipment, e.g., laundry equipment 16, should be set to provide optimum batch processing, as well as the user being provided a list of processing additives, e.g., detergent, to be employed in the batch processing. In other examples, some of the instructions are also sent directly to the processing equipment, e.g., laundry equipment 16, so that the processing equipment is automatically adjusted to meet the conditions for optimized batch processing of the batch of items. e.g., clothing items.

In some embodiments, when the batch processing cycles are completed, as items are removed, scent and amount of dirt are analyzed for future learning cycles. The system uses machine learning to learn, identify, adapt and correct a user's typical loading and sorting behavior so the user too begins to learn item compatibility.

In one scenario, a user 10 using the batch management system 100 in laundering clothing, the user may not have the time to sort the items of clothing 11 being cleaned and/or to understand the special care needed for each of the items. In this scenario after the user 10 selects to override the system 100 at block 6 of the method depicted in FIG. 3, the batch management system 100 provides for washing the clothing at the lowest common denominator, e.g., a wash cycle that includes cold water and a delicate clothes washer setting for the laundry equipment 16.

In another scenario, a user 10 that is not aware of the special care of clothing items 11 is watching a batch of clothing using the batch management system 100. The items 11 are automatically scanned by a scanner 13 at block 3 of the method depicted in FIG. 3, and he/she is instructed to remove a red shirt from white laundry at block 5 of the method depicted in FIG. 3.

In yet another scenario, the batch management system 100 captures that the user 10 is batch processing laundry items 11 that are characterized as being all permanent press light colors in the batch processing equipment. e.g., laundry equipment 16, based on analyzing pictures taken with a camera 12 as the user 10 places the items in the machine. The system sets the temperature for the batch processing of the items accordingly.

In yet a further scenario, the batch management system 100 has determined that the user 10 is mixing whites and colors. However, the user 10 overrides the batch management system 100 to continue the process. The batch management system 100 recommends adding a color catcher additive.

In an even further scenario, the batch management system 100 has determined that the items of clothing 11 are extra dirty, based on comparing the current image of the items of clothing 11 taken by the camera 12 to historical images of the item taken with previous batch cycles. The batch management system 100 recommends an extra cycle of batch processing.

In an even further scenario, the batch management system 100 has determined that the items of clothing 11 are extra dirty, based on comparing the current image of the items of clothing 11 taken by the camera 12 to historical images of the item taken with previous batch cycles. The batch management system 100 recommends an extra cycle of batch processing.

In an even further scenario, the batch management system 100 has determined that the items of clothing 11 have a scent that is not suitable for use without additional processing. The batch management system 100 recommends to the user 10 adding a scent freshener to the first cycle.

FIG. 4 is a block diagram illustrating a system for optimizing batch processing, in accordance with some embodiments of the present disclosure. Some of the elements that have been described above with reference to FIG. 4 have been described as employing a processor, such as a hardware processor, and a form of memory, such as hardware, memory to perform functions. A hardware processor, or "microprocessor," is a chip that resides in computers and other electronic devices. The processor is to receive input and provide the appropriate output. The hardware memory may include a random access memory (RAM) device, a read-only memory (ROM) device, an erasable programmable read-only memory (EPROM or Flash memory) device, a static random access memory (SRAM) device and combinations thereof.

Each of the components for the response system 100 that is depicted in FIG. 4 may be interconnected via a system bus 102.

Any of the systems or machines (e.g., devices) shown in FIG. 4 may be, include, or otherwise be implemented in a special-purpose (e.g., specialized or otherwise non-generic) computer that has been modified (e.g., configured or programmed by software, such as one or more software modules of an application, operating system, firmware, middleware, or other program) to perform one or more of the functions described herein for that system or machine. For example, a special-purpose computer system able to implement any one or more of the methodologies described herein is discussed above with respect to FIG. 3, and such a special-purpose computer may, accordingly, be a means for performing any one or more of the methodologies discussed herein. Within the technical field of such special-purpose computers, a special-purpose computer that has been modified by the structures discussed herein to perform the functions discussed herein is technically improved compared to other special-purpose computers that lack the structures discussed herein or are otherwise unable to perform the functions discussed herein. Accordingly, a special-purpose machine configured according to the systems and methods discussed herein provides an improvement to the technology of similar special-purpose machines.

The locating system 100 may be integrated into the processing system 400 depicted in FIG. 5. The processing system 400 includes at least one processor (CPU) 104 operatively coupled to other components via a system bus 102. A cache 106, a Read Only Memory (ROM) 108, a Random Access Memory (RAM) 110, an input/output (I/O) adapter 120, a sound adapter 130, a network adapter 140, a user interface adapter 150, and a display adapter 160, are operatively coupled to the system bus 102. The bus 102 interconnects a plurality of components has will be described herein.

The system 400 depicted in FIG. 5, may further include a first storage device 122 and a second storage device 124 are operatively coupled to system bus 102 by the I/O adapter 120. The storage devices 122 and 124 can be any of a disk storage device (e.g., a magnetic or optical disk storage device), a solid state magnetic device, and so forth. The storage devices 122 and 124 can be the same type of storage device or different types of storage devices.

A speaker 132 is operatively coupled to system bus 102 by the sound adapter 130. A transceiver 142 is operatively coupled to system bus 102 by network adapter 140. A display device 162 is operatively coupled to system bus 102 by display adapter 160.

A first user input device 152, a second user input device 154, and a third user input device 156 are operatively coupled to system bus 102 by user interface adapter 150. The user input devices 152, 154, and 156 can be any of a keyboard, a mouse, a keypad, an image capture device, a motion sensing device, a microphone, a device incorporating the functionality of at least two of the preceding devices, and so forth. Of course, other types of input devices can also be used, while maintaining the spirit of the present invention. The user input devices 152, 154, and 156 can be the same type of user input device or different types of user input devices. The user input devices 152, 154, and 156 are used to input and output information to and from system 400.

Of course, the processing system 400 may also include other elements (not shown), as readily contemplated by one of skill in the art, as well as omit certain elements. For example, various other input devices and/or output devices can be included in processing system 400, depending upon the particular implementation of the same, as readily understood by one of ordinary skill in the art. For example, various types of wireless and/or wired input and/or output devices can be used. Moreover, additional processors, controllers, memories, and so forth, in various configurations can also be utilized as readily appreciated by one of ordinary skill in the art. These and other variations of the processing system 400 are readily contemplated by one of ordinary skill in the art given the teachings of the present invention provided herein.

The present invention may be a system, a method, and/or a computer program product at any possible technical detail level of integration. The computer program product may include a computer readable storage medium (or media) having computer readable program instructions thereon for causing a processor to carry out aspects of the present invention.

For example, the present disclosure provides a computer program product comprising a non-transitory computer readable storage medium having computer readable program code embodied therein for controlling a secondary system with a primary system for taking commands. The method may include capturing initial commands to the primary system to provide a historical database of commands, wherein the historical database of initial commands includes requests for functions to be performed by at least one secondary device and requests not directed to functions to be performed by at least one secondary device. In a follow step, the method can include analyzing the historical database to create a probability factor for matching the initial commands to the primary device and a following interaction to generate secondary requests. In a following step, a user receives a command at the primary device, and it is determined whether the user command at the primary device matches at least one initial commands having above a threshold value for the probability factor linking the initial command to the primary device to the request the at least one secondary device. The method can further include sending a signal to activate the at least one secondary device to perform the request without requiring an activation command from the user. In some examples, the second device has a sleep mode that is activated automatically by the user command at the primary device that matches at least one of the initial commands having above a threshold value for the probability factor.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as SMALLTALK. C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The methods of the present disclosure may be practiced using a cloud computing environment. Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models. Characteristics are as follows:

On-demand self-service; a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load balancing between clouds).

A cloud computing environment is service oriented with a focus on statelessness, low coupling, modularity, and semantic interoperability. At the heart of cloud computing is an infrastructure comprising a network of interconnected nodes.

Figure 6:
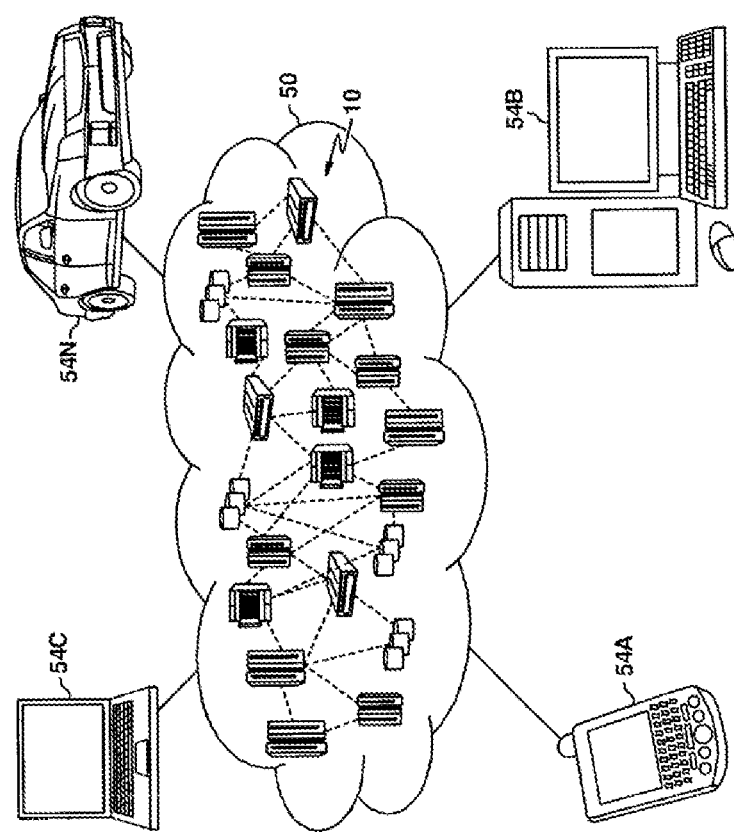
FIG. 6 depicts a cloud computing environment according to an embodiment of the present disclosure.

Referring now to FIG. 6, illustrative cloud computing environment 50 is depicted. As shown, cloud computing environment 50 includes one or more cloud computing nodes 51 with which local computing devices used by cloud consumers, such as, for example, mobile and/or wearable electronic devices 54A, desktop computer 54B, laptop computer 54C, and/or automobile computer system 54N may communicate. Nodes 110 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 8 are intended to be illustrative only and that computing nodes 51 and cloud computing environment 50 can communicate with any type of computerized device over any type of network and/or network addressable connection (e.g., using a web browser).

Figure 7:
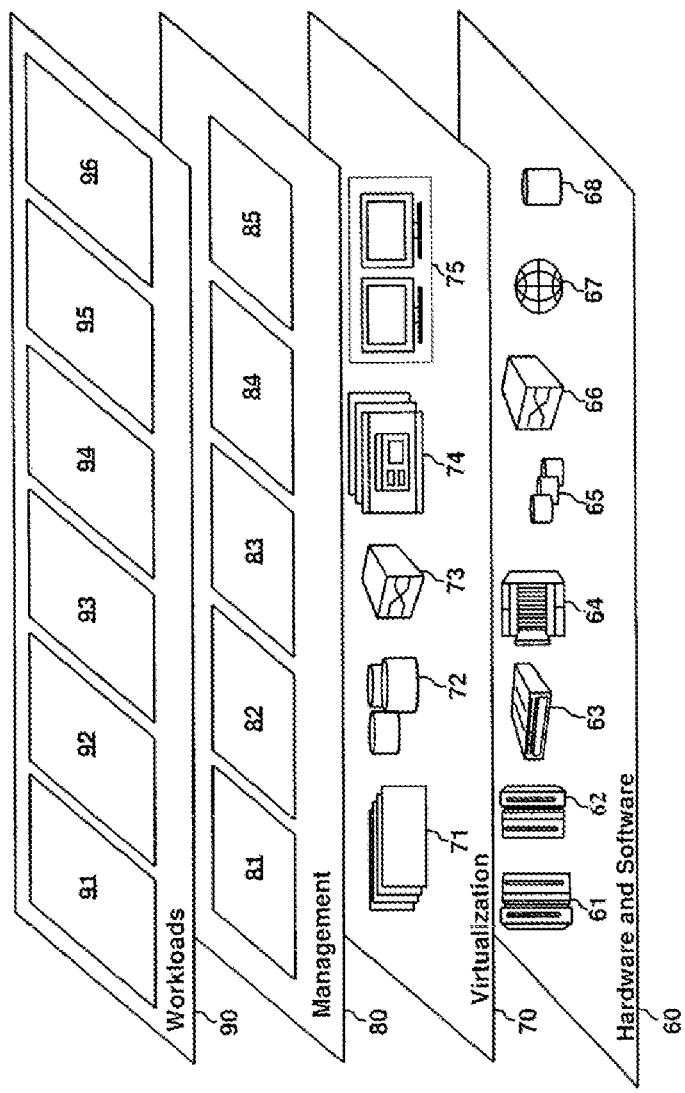
FIG. 7 depicts abstraction model layers according to an embodiment of the present disclosure.

Referring now to FIG. 7, a set of functional abstraction layers provided by cloud computing environment 50 (FIG. 6) is shown. It should be understood in advance that the components, layers, and functions shown in FIG. 7 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided; virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and application for the object locating system 100, which is described with reference to FIGS. 1-7.

It is to be appreciated that the use of any of the following "/", "and/or", and "at least one of" for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as readily apparent by one of ordinary skill in this and related arts, for as many items listed.

Having described preferred embodiments of a process to optimize processing methods of multiple batched articles having different characteristics (which are intended to be illustrative and not limiting), it is noted that modifications and variations can be made by persons skilled in the art in light of the above teachings. It is therefore to be understood that changes may be made in the particular embodiments disclosed which are within the scope of the invention as outlined by the appended claims. Having thus described aspects of the invention, with the details and particularity required by the patent laws, what is claimed and desired protected by Letters Patent is set forth in the appended claims.

What is claimed is:

1. A computer enabled method for optimizing a batch processing task comprising:
    registering a user to a batch management system that collects data from the user, wherein the user can revoke permission to the batch management system at any time;
    registering item types to be processed by the batch management system including care instructions for the item types;
    recording batch items being added to a batch processing machine;
    determining compatibility of at least one of said batch items being added to the batch processing machine to a total batch with an item to be processed to registered item match generator of said batch management system, wherein said determining compatibility comprises matching said at least one of said batch items being added to the batch processing machine to the care instructions of said registered item types; and
    reporting compatibility of said at least one of said batch items being added to the batch processing machine.

2. The computer enabled method of claim 1, wherein determining compatibility of the at least one of said each of said batch items being added to the batch processing machine to a total batch with an item to be processed to registered item match generator includes executing a set of matching instructions using artificial intelligence, the artificial intelligence being stored in memory in the item to be processed to registered item match generator for executing the matching instructions by a hardware processor.

3. The computer enabled method of claim 1, further comprising employing machine learning to determine a user's historical preferences for batch processing; and recording the historical preferences in the user registry.

4. The computer enabled method of claim 3, further comprising identifying processing additives for the batch processing.

5. The computer enabled method of claim 4, wherein identifying the processing additives comprises comparing the settings of the batch processing machine, the care instructions for the item types matching the batch items, and the historical preferences to provide processing conditions, and identifying additives meeting the processing conditions.

6. The computer enabled method of claim 1, wherein said reporting compatibility of said at least one of said each item being added to the batch processing machine is by text through a mobile device in communication with the user.

7. The computer enabled method of claim 1, wherein said reporting compatibility of said at least one of said each item being added to the batch processing machine is by voice message through a digital assistant in communication with the user.

8. The computer enabled method of claim 1, wherein the batch items are clothing items.

9. The computer enabled method of claim 1, wherein the batch processed machine is clothes laundering equipment.

10. The computer enabled method of claim 1, wherein said recording batch items being added to the batch processing machine comprises cameras taking images of the batch items.

11. The computer enabled method of claim 1, wherein said recording batch items being added to the batch processing machine comprises scanners scanning the batch items.

12. The computer enabled method of claim 1, wherein said recording batch items being added to the batch processing machine comprises manual entry of the batch items by the user using text communication to the batch management system.

13. A batch management system for optimizing a batch processing task comprising:
   an item registry for registering item types to be processed by the batch management system including care instructions for the item types;
   an article identity interface for recording batch items being added to a batch processing machine;
   an item to be processed to registered item match generator for determining compatibility of at least one of said each of said batch items being added to the batch processing machine to a total batch, wherein said determining compatibility comprises matching said at least one of said each item being added to the batch processing machine to the care instructions of said registered item types; and
   an item compatibility message transmitter for reporting compatibility of said at least one of said each item being added to the batch processing machine.

14. The batch management system of claim 13, wherein determining compatibility of the at least one of said each of said batch items being added to the batch processing machine to a total batch with an item to be processed to registered item match generator includes executing a set of matching instructions using artificial intelligence, the artificial intelligence being stored in memory in the item to be processed to registered item match generator for executing the matching instructions by a hardware processor.

15. The batch management system of claim 13, further comprising employing machine learning to determine a user's historical preferences for batch processing; and recording the historical preferences in the user registry.

16. The batch management system of claim 15, further comprising identifying processing additives for the batch processing, wherein identifying the processing additives comprises comparing the settings of the batch processing machine, the care instructions for the item types matching the batch items, and the historical preferences to provide processing conditions, and identifying additives meeting the processing conditions.

17. A computer program product comprising a computer readable storage medium having computer readable program code embodied therein for optimizing a batch processing task, the method comprising:
   registering a user to a batch management system that collects data from the user, wherein the user can revoke permission to the batch management system at any time;
   registering item types to be processed by the batch management system including care instructions for the item types;
   recording batch items being added to a batch processing machine;
   determining compatibility of at least one of said each of said batch items being added to the batch processing machine to a total batch with an item to be processed to registered item match generator of said batch management system, wherein said determining compatibility comprises matching said at least one of said each item being added to the batch processing machine to the care instructions of said registered item types; and
   reporting compatibility of said at least one of said each item being added to the batch processing machine.

18. The computer program product of claim 17, wherein determining compatibility of the at least one of said each of said batch items being added to the batch processing machine to a total batch with an item to be processed to registered item match generator includes executing a set of matching instructions using artificial intelligence, the artificial intelligence being stored in memory in the item to be processed to registered item match generator for executing the matching instructions by a hardware processor.

19. The computer program product of claim 17, further comprising employing machine learning to determine a user's historical preferences for batch processing; and recording the historical preferences in the user registry.

20. The computer program product of claim 17, further comprising identifying processing additives for the batch processing.

* * * * *